Oct. 18, 1938.    J. L. PERKINS    2,133,568
WRINGER HEAD
Filed June 4, 1937
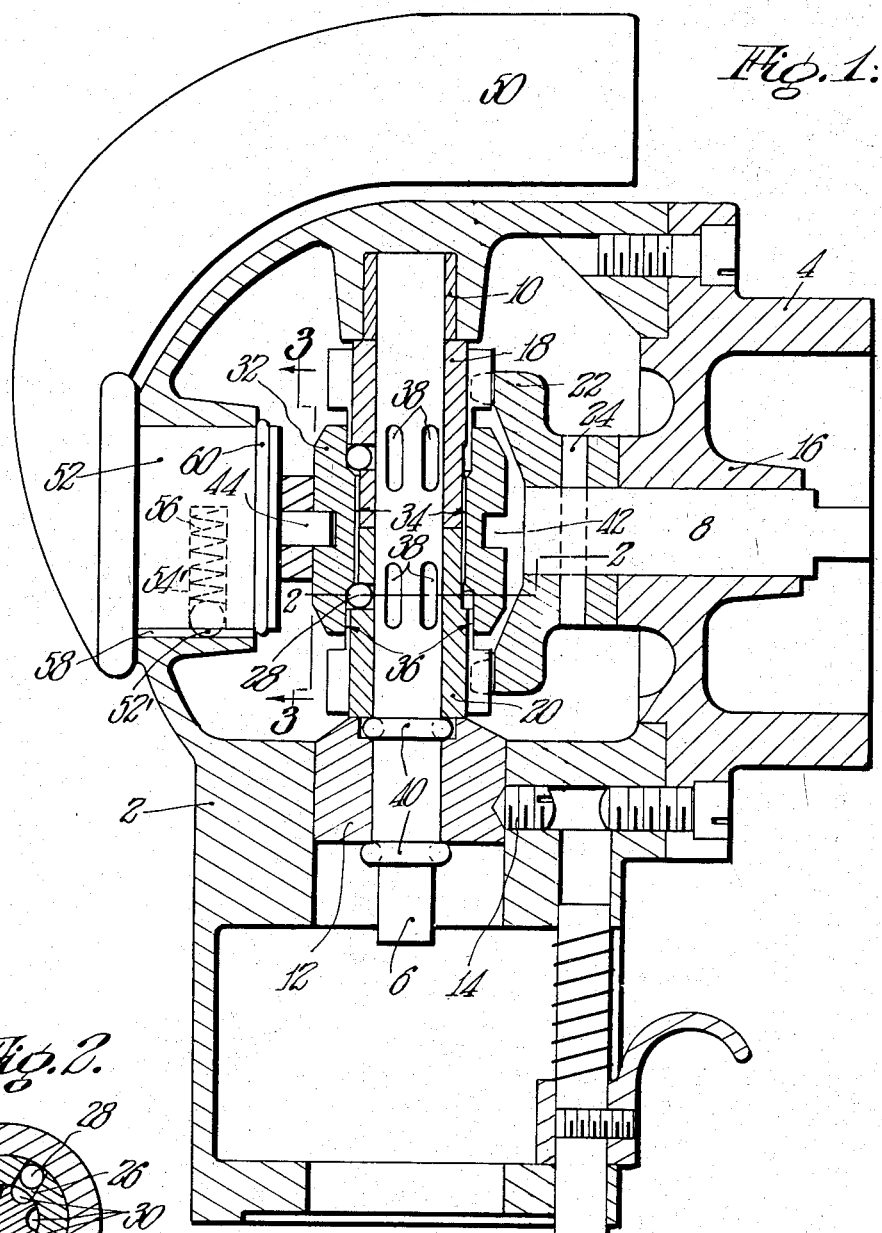
Fig. 1.
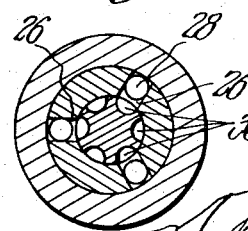
Fig. 2.
Fig. 3.
INVENTOR.
Julian L. Perkins.
BY Walter C. Ross.
ATTORNEY.

Patented Oct. 18, 1938

2,133,568

UNITED STATES PATENT OFFICE 2,133,568

WRINGER HEAD

Julian L. Perkins, West Springfield, Mass.

Application June 4, 1937, Serial No. 146,348

1 Claim. (Cl. 74—378)

This invention relates to improvements in gear mechanism and is directed more particularly to improvements in heads for driving wringers or the like.

The principal objects of the invention are directed to improvements in a wringer head which is simple in form so as to be economical to produce and which is efficient in operation. It has been customary in connection with wringer heads to provide a pair of bevel gears which are arranged for alternate engagement with another gear but according to this invention there is provided a pair of simple gears which are in constant mesh with a common gear thus not only saving in manufacturing costs but providing a mechanism which is practically noiseless because there are no clashing gears.

The apparatus of the invention is characterized by various other novel features of construction and arrangement adapting the apparatus for various uses although it is hereinafter described in connection with a wringer head or the like. The invention in the form at present preferred is illustrated in the accompanying drawing wherein:

Fig. 1 is an elevational sectional view through a wringer head embodying the novel features of the invention;

Fig. 2 is a sectional plan view on the line 2—2 of Fig. 1; and

Fig. 3 is a fragmentary sectional elevational view on the line 3—3 of Fig. 1.

Referring now to the drawing in detail the invention will be fully described.

A casing or housing 2 is provided which in the form of the invention to be described is arranged for mounting on the upper end of the column of a washing machine and it is adapted to support and operate a wringer. Preferably there is provided an end member 4 or other means for securing to a wringer.

There are two rotatable shafts 6 and 8, the former for connecting to a shaft which usually extends up through the column of the washing machine and the latter for connecting to a wringer for driving the same. A bearing 10 for the upper end of the shaft 6 is carried by the casing and the lower end is journalled in a member 12 which may be secured to the casing by means of a screw 14 or the like. The shaft 8 is journalled in a bearing such as 16.

Gears 18 and 20 are provided which are normally rotatable on shaft 6. They permanently mesh with a face or bevel gear 22 which is fixed to shaft 8 as by a pin 24. Each of the gears 18 and 20 is formed to have one or more radial passageways 26 which receive connecting members or keys and the latter, in the form of the invention shown, consists of balls 28.

The balls 28 are also receivable in sockets such as 30 which are provided in the shaft 6. An actuating member 32 is arranged to be slidable longitudinally with reference to shaft 6 and it has an inner relatively restricted bore 34 and outer larger bores 36.

The actuator 32 is adapted to move from the neutral inoperative position shown in Fig. 1 to operative positions above and below the said neutral position. As it is moved from the neutral position shown to an operative position, the keys 28 are caused to become confined within the smaller bore 34 so as to enter the sockets 30 and thereby lock either the gear 18 or 20 to the shaft, the parts being arranged so that the actuator alternately locks either the gear 18 or 20 according to which direction the actuator is moved.

The shaft 8 is adapted to be rotated in opposite directions, while the shaft 6 is held against axial movements by rings such as 40 seated thereon. The actuator 32 may, of course, be moved by various means but in the form of the invention shown it has an annular groove 42 in which there is a stud 44 which is carried by the end of a member 46, which is pivoted at 48 to the casing.

An operating member 50 has a part 52 rotatable in the casing and it carries a pin 54 which is disposed in a slot 56 of member 46. As the oscillating member is oscillated back and forth between the central or neutral inoperative position to operative positions at either side thereof, the member 46 is moved up and down on its pivot so that pin 44 thereof which is disposed in the groove 42 of the actuator member 32 moves the said member 32.

A detent 52' may be provided in a bore 54' provided in the part 52' and this is urged outwardly by a spring 56. The casing is provided with one or more grooves 58 which receive the detent whereby the operating member is releasably held in various positions.

While I have described the invention in great detail and with respect to a preferred form thereof, it is not desired to be limited thereto since many changes and modifications may be made therein without departing from the spirit and scope of the invention.

What it is desired to claim and secure by Letters Patent of the United States is:

The combination in a wringer head of, a support, a drive shaft and a driven shaft rotatable therein, separate gears rotatable on said drive shaft, a gear secured to said driven shaft meshing with said separate gears on said drive shaft, the said drive shaft having upper and lower recesses, the said separate gears having keys radially guided for movements into and out of said recesses for clutching said gears to the drive shaft, an actuator shiftable axially in opposite directions relative to said drive shaft having means associated therewith for moving and holding said keys in clutching position or releasing the same to allow them to move to non-clutching position adapted and arranged whereby the keys are actuated for independently clutching either one of said separate gears to said drive shaft, an operating member having a hub part journalled on a certain axis in said support so as to be swingable relative to said support between a neutral and clutching positions at either side thereof, a member pivoted at one end to said casing having a projection in operative engagement with a recess provided in said actuator, and a projection on said hub part at a side of said certain axis and in operative engagement with a recess provided in said member, all adapted and arranged whereby as the operating member is swung the projection on the hub part thereof swings said member to move said actuator.

JULIAN L. PERKINS.